3,522,269
DEHYDROGENATION OF PYRROLIDINE
TO PYRROLE
Pio Guyer, Zurich, and Dieter Fritze, Mannedorf, Switzerland, assignors to Cilag-Chemie, a corporation of Switzerland
No Drawing. Filed Sept. 13, 1967, Ser. No. 667,374
Int. Cl. C07d 27/00
U.S. Cl. 260—313.1                4 Claims

ABSTRACT OF THE DISCLOSURE

A process for the catalytic dehydrogenation of pyrrolidine to pyrrole by passing pyrrolidine in the vapor phase with hydrogen over a palladium catalyst supported on silica gel or silica gel having a silanol group density of 5–10 SiOH/$10^{-18}$ m.$^2$ surface area.

---

This invention relates to an improved process for the catalytic dehydrogenation of pyrrolidine to pyrrole in the vapor phase.

It is already known that unsaturated heterocyclic nitrogen compounds, such as pyridine, N-methylpyrrole and the like, can be produced by catalytic dehydrogenation of the corresponding saturated aza compounds. But these processes, using oxidic catalysts at high temperatures, give small yields in the case of pyrrole due to the fact that substantial quantities of by-products are formed through decomposition of the intermediate or final products. Moreover, the catalysts lose their activity after a relatively short period so that the percent conversion falls rapidly. By using catalysts of the platinum group, the reaction temperature can be lowered with some success in decreasing the amount of undesired by-products. An improved process, for example, was described in U.S. Pat. No. 3,008,965, which provided for the catalytic dehydrogenation of certain azaheterocyclics at lower temperatures of about 175–350° C. In the dehydrogenation of pyrrolidine to pyrrole, however, conversion of only 65% was obtained by passing pyrrolidine in the vapor phase at 275–300° C. over a 0.5% Pd on alumina catalyst, while a silica-alumina catalyst support (87% silica and 13% alumina by weight) provided an even less active catalyst. Also under these conditions, the catalyst activity subsided after 12–15 hours. This deactivation of the catalyst is due to a poisoning of the catalyst through deposition of resinous by-products on the catalyst surface, which products are formed by decompositions and side-reactions occurring in the synthesis of pyrrole. The special difficulties arising in the case of pyrrole are particularly due to the very unstable pyrroline which is formed as an intermediate in the dehydrogenation of pyrrolidine. The pyrroline polymerizes readily and also reacts with the pyrrole to form an additive which, due to its high boiling point, remains on the catalyst surface so that resinification occurs on the supported catalyst. It is for this reason that no process has been heretofore known for manufacturing pyrrole in very good yields and at a high percent conversion without rapid deactivation of the catalyst.

It is an object of this invention to provide a process for the catalytic dehydrogenation of pyrrolidine to pyrrole, wherein the poisoning of the catalyst is minimized and excellent yields and precent conversions are achieved.

We have now found it possible to obtain pyrrole from pyrrolidine with practically total conversion and overall high yields if pyrrolidine in the vapor phase is passed together with hydrogen, preferably 3–10 molecular proportions of hydrogen, over a palladium catalyst supported on silica gel (without alumina). The process of the invention is performed, not at temperatures lower than 350° C. as suggested by the prior art, but, rather, at temperatures of 350–500° C., preferably 400–450° C.

It has furthermore been found, surprisingly, that it is possible to obtain pyrrole from pyrrolidine with practically 100 percent conversion and yields of 95% or more without notable deactivation of the catalyst for several days by passing pyrrolidine in the vapor phase together with 3–10 molecular proportions of hydrogen over a palladium catalyst supported on silica gel having a silanol (SiOH) group density of 5–10 SiOH/$10^{-18}$ square meters surface area, preferably 6–8 SiOH groups/$10^{-18}$ m.$^2$ surface area, at temperatures of 350–500° C., preferably 400–450° C.

By using as the catalyst support a silica gel characterized by a silanol group density of 5–10 SiOH/$10^{-18}$ m.$^2$ surface area, there results a reduction in the pyrroline concentration on the catalyst and a reduction in the polymerization of pyrroline, the combination of which affords a significant increase in the life of the catalyst. With silica gels having a silanol group density of less than 5 or more than 10 SiOH/$10^{-18}$ m.$^2$ surface area, catalyst efficiency diminishes.

Silica gels having the prescribed silanol density per unit area are commercially available and may be prepared by conventional methods. Determination of the number of SiOH groups on the silica gel support may be obtained by conventional methods, for example, by the loss of weight of the gel by calcination at about 1000° C. as compared to normal drying at about 150° C. under high vacuum (9 g. equal to 1 SiOH group). The corresponding surface area is determinable by the nitrogen-low temperature adsorption method.

The amount of palladium catalyst introduced into the silica gel support may range from 0.5–4%, preferably 0.8–1.5%, of the weight of the gel. Introduction of the catalyst may be effected by conventional methods, for example, by impregnation of the silica gel with palladium chloride, for example, by soaking the gel in a solution thereof in hydrochloric acid and reducing the chloride to the metal by means of hydrogen or formaldehyde and caustic soda.

According to this invention, the use of a palladium catalyst on a silica gel support having the prescribed silanol group density per unit surface area at temperatures of 350–500° C. in the presence of high proportions of hydrogen results in an improved method and an outstanding technical process for producing pyrrole from pyrrolidine. Although not essential, it is economically more favorable to recirculate the hydrogen rather than employ fresh hydrogen throughout the process.

The invention is illustrated by but not limited to the following examples.

EXAMPLE I

One liter (approximately 0.44–0.50 kg.) of silica gel with a silanol group density of 6 SiOH/$10^{-18}$ m.$^2$ surface area is impregnated with diluted hydrochloric acid solution containing 10 g. of PdCl$_2$ and dried at 105° C. The PdCl$_2$ is then reduced to Pd by means of hydrogen under the usual conditions. In a salt-bath tube reactor, 225 g. of pyrrolidine vapors mixed with 680 N.T.P. liters of hydrogen per hour are passed over the above Pd on silica gel catalyst at 420° C. The reaction products are condensed at −10° C. In this way, the conversion of pyrrolidine is 99.7% and 208 g. of pyrrole per hour are obtained with a purity of 96–98%. The activity of the catalyst remains unchanged for more than 200 hours, and according to this method, a practically unchanged composition of the reaction product is obtained even after 100 hours.

EXAMPLE II

Repetition of Example I, but with an equivalent amount of normal silica gel as the catalyst support, also shows within the first 4 hours a conversion of nearly 100%, although the yield of pyrrole is about 87%. After an additional 4 hours, the yield decreases to 80%. In addition, small quantities of unconverted pyrrolidine, larger quantities of pyrroline and higher pyrrole-bases appear in the final product.

EXAMPLE III

According to the procedure of Example I, a mixture of 1 kg. of pyrrolidine in the vapor phase, and 3 N.T.P. cubic meters of hydrogen per hour at 430° C. are passed over 5 liters of a palladium on silica gel catalyst, said silica gel having 7 $SiOH/10^{-18}$ m.² surface area, with condensation of the reaction products at −10° C. 633 N.T.P. liters of hydrogen, the quantity formed by dehydrogenation, is let off continuously, while 3 N.T.P. cubic meters per hour are conducted back in circulation. The reaction product contains 97–98% of pyrrole after 100 hours run of reaction, and 96–97% of pyrrole after 200 hours; the conversion of the pyrrolidine was always practically 100%.

What is claimed is:

1. A process for the catalytic dehydrogenation of pyrrolidine to pyrrole which comprises passing pyrrolidine vapor with hydrogen over a catalyst consisting essentially of palladium metal supported on silica gel, said silica gel being characterized by a silanol group density of 5–10 $SiOH/10^{-18}$ square meters surface area, at temperatures of from 350° C. to 500° C.

2. A process for the catalytic dehydrogenation of pyrrolidine to pyrrole which comprises passing pyrrolidine vapor with 3 to 10 molecular proportions of hydrogen over a catalyst consisting essentially of palladium metal supported on silica gel, said silica gel being characterized by a silanol group density of 5–10 $SiOH/10^{-18}$ square meters surface area, at a temperature of from 350° C. to 500° C.

3. The process of claim 2, wherein the temperature is from 400° C. to 450° C.

4. The process of claim 2, wherein the silica gel is characterized by a silanol group density of 6–8 $SiOH/10^{-18}$ square meters surface area.

References Cited

UNITED STATES PATENTS 3,008,965   11/1961   Zellner _____ 260—313.1

FOREIGN PATENTS 832,855   4/1960   Great Britain.

ALEX MAZEL, Primary Examiner

J. A. NARCAVAGE, Assistant Examiner

U.S. Cl. X.R.

252—459